US006809899B1

(12) United States Patent
Chen et al.

(10) Patent No.: US 6,809,899 B1
(45) Date of Patent: Oct. 26, 2004

(54) MAGNETIC HEADS FOR PERPENDICULAR RECORDING WITH TRAPEZOIDAL POLE TIPS

(75) Inventors: Yingjian Chen, Fremont, CA (US); Yugang Wang, Milpitas, CA (US); Francis Liu, Fremont, CA (US); Xizeng Shi, Fremont, CA (US); Kyusik Sin, Palo Alto, CA (US); Hugh Craig Hiner, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/751,215

(22) Filed: Dec. 31, 2003

Related U.S. Application Data

(63) Continuation of application No. 09/933,508, filed on Aug. 20, 2001.

(51) Int. Cl.[7] .............................................. G11B 5/147
(52) U.S. Cl. ...................... 360/125; 360/126; 360/317
(58) Field of Search .............................. 360/126, 125, 360/119, 317

(56) References Cited

U.S. PATENT DOCUMENTS

| | | | | |
|---|---|---|---|---|
| 4,423,450 A | | 12/1983 | Hamilton | 360/111 |
| 4,751,598 A | | 6/1988 | Hamilton | 360/110 |
| 4,843,507 A | * | 6/1989 | Schewe et al. | 360/125 |
| 4,860,139 A | * | 8/1989 | Hamilton | 360/126 |
| 4,873,599 A | * | 10/1989 | Sueoka | 360/126 |
| 4,970,615 A | | 11/1990 | Gau | 360/122 |
| 4,970,616 A | | 11/1990 | Ramaswamy | 360/122 |
| 5,126,232 A | | 6/1992 | Gau | 430/320 |
| 5,137,750 A | | 8/1992 | Amin et al. | 427/116 |
| 5,453,315 A | | 9/1995 | Hamilton et al. | 428/209 |
| 5,557,488 A | | 9/1996 | Hamilton et al. | 360/104 |
| 5,615,069 A | | 3/1997 | Slade et al. | 360/126 |
| 5,687,046 A | | 11/1997 | Mathews | 360/126 |
| 5,737,826 A | | 4/1998 | Slade et al. | 29/603.15 |
| 5,949,625 A | | 9/1999 | Sato et al. | 360/122 |
| 5,995,341 A | | 11/1999 | Tanaka et al. | 360/125 |
| 5,999,380 A | | 12/1999 | Slade et al. | 360/122 |
| 6,054,023 A | | 4/2000 | Chang et al. | 204/192.2 |
| 6,069,775 A | | 5/2000 | Chang et al. | 360/126 |
| 6,163,442 A | | 12/2000 | Gill et al. | 360/317 |
| 6,504,675 B1 | | 1/2003 | Shukh et al. | 360/125 |
| 6,513,228 B1 | * | 2/2003 | Khizroev et al. | 360/126 |
| 6,687,085 B2 | * | 2/2004 | Minor et al. | 360/126 |
| 6,693,768 B1 | * | 2/2004 | Crue et al. | 360/126 |
| 6,697,221 B2 | * | 2/2004 | Sato et al. | 360/126 |
| 6,710,973 B2 | * | 3/2004 | Okada et al. | 360/125 |
| 6,721,131 B2 | * | 4/2004 | Litvinov et al. | 360/125 |

OTHER PUBLICATIONS

U.S. Provisional application No. 60/175,860, Batra, filed Jan. 12, 2000.
U.S. Provisional application No. 60/206,872, Shukh et al., filed May 24, 2000.
IEEE Transactions on Magnetics article entitled "Off–Track Performance of Thin Film Single Pole Head For Perpendicular Double–Layered Media", by H. Yamada et al., vol. 34, No. 4, Jul. 1998, pp. 1468–1470.

* cited by examiner

*Primary Examiner*—R. S. Tupper
(74) *Attorney, Agent, or Firm*—Mark Lauer; Silicon Edge Law Group LLP

(57) ABSTRACT

Electromagnetic transducers are disclosed having write poles with a leading edge that is smaller than a trailing edge, which can reduce erroneous writing for perpendicular recording systems. The write poles may have a trapezoidal shape when viewed from a direction of an associated medium. The write poles may be incorporated in heads or sliders that also contain read elements such as magnetoresistive sensors, and may be employed with information storage systems such as disk drives.

25 Claims, 8 Drawing Sheets

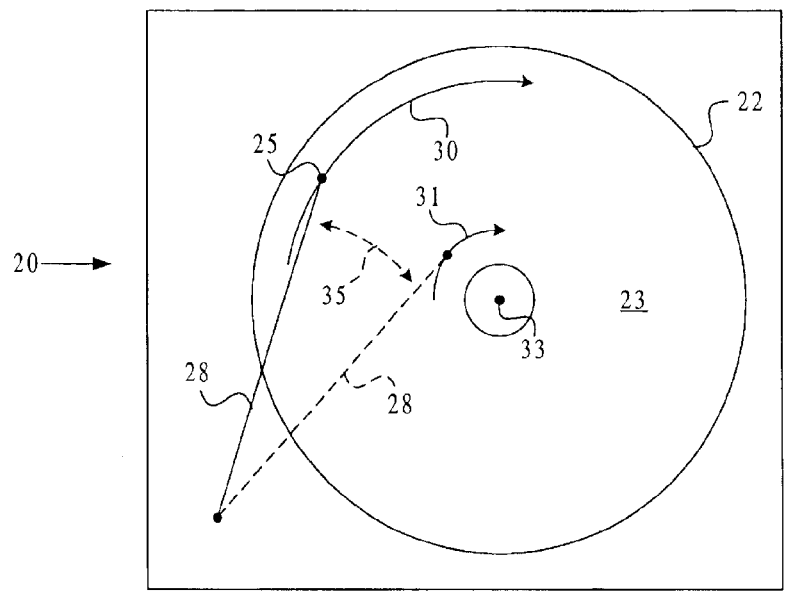
FIG. 1
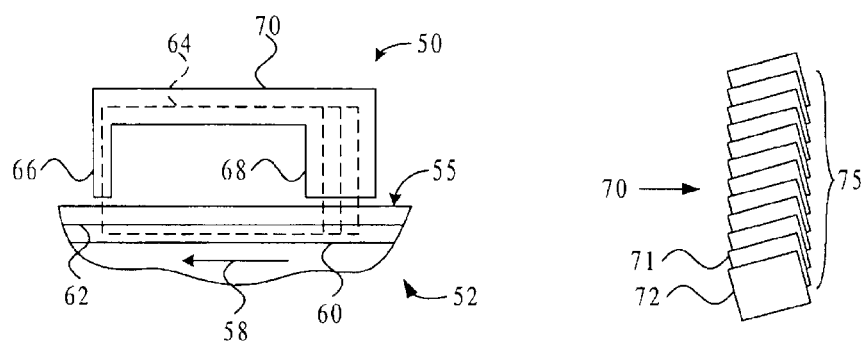
FIG. 2
(PRIOR ART)
FIG. 3
(PRIOR ART)

MAGNETIC HEADS FOR PERPENDICULAR RECORDING WITH TRAPEZOIDAL POLE TIPS

CROSS-REFERENCE TO RELATED APPLICATIONS

This application claims the benefit under 35 U.S.C. §120 of, (and is a continuation of) U.S. patent application Ser. No. 09/933,508, filed Aug. 20, 2001, which is incorporated by reference herein.

BACKGROUND OF THE INVENTION

The present invention relates to electromagnetic transducers for information storage and retrieval systems, such as disk or tape drives.

FIG. 1 is a schematic top view of a disk drive storage system 20, including a spinning disk 22 coated with a media layer 23 and a transducer 25 held by an arm 28 for storing and retrieving information on the media. Such a drive system 20 may have another transducer for storing and retrieving information on another media layer on an opposite side of the disk 22, and may have additional disks and associated transducers, not shown. The transducer 25 may be attached to a slider that is held near a free end of the arm 28 by a gimbal structure. The transducer 25 writes and reads data on multiple concentric tracks of the disk 22 such as track 30. To instead write and read data on another track 31 that is near a center 33 of the disk 22, the arm is driven by an actuator, not shown, to move the transducer toward the center 33. By sweeping the arm 28 over the surface of the disk 22, as shown by arrow 35, the transducer 25 can access the multiple data tracks. The orientation of the transducer, however, is skewed relative to tracks such as 30 and 31 disposed near outer and inner radiuses of the media layer.

Current commercially available disk drives store data in domains having magnetizations that are substantially parallel to tracks such as tracks 30 and 31, which is sometimes called longitudinal recording. It has been predicted that such longitudinal magnetic storage will become unstable at normal operating conditions when the domains reach a minimal size, termed the superparamagnetic limit. In order to store the data at higher density, the drive system 20 may instead be designed to store data in domains that are substantially perpendicular to the disk 22 surface, which may be termed perpendicular recording.

FIG. 2 is a schematic side view of a prior art system for perpendicular recording, including a transducer 50 positioned in close proximity to a surface 55 of a disk 52 that is moving relative to the transducer in the direction of arrow 58. The disk has a media layer 60 that has an easy axis of magnetization that is substantially perpendicular to the disk 22 surface. The disk also has a low-coercivity, high-permeability ("soft magnetic") underlayer 62 that provides a path for magnetic flux, allowing the flux 64 written by the transducer to be directed substantially perpendicular to the disk surface. The transducer 50 includes a write pole 66 and a return pole 68 that are magnetically coupled by a magnetic layer 70 in the transducer and by the underlayer 60 to form a magnetic circuit, with the write pole 66 communicating a more concentrated flux 64 through the media 62 than the return pole 68, for magnetizing the media adjacent the write pole.

FIG. 3 illustrates a prior art pattern of magnetization 70 of such a write pole 66 for a track such as track 30 where the transducer is skewed relative to the track. The write pole has a conventional rectangular area facing the media, which is reflected in the most recent magnetization 72. Prior magnetizations written to the media, such as magnetization 71, have edge effects or side writing 75 from the skew that may lead to errors in reading data.

SUMMARY OF THE INVENTION

In accordance with the present invention, write poles having a leading edge that is smaller than a trailing edge are disclosed, which can reduce erroneous writing for perpendicular recording systems. The write poles may have a trapezoidal shape when viewed from a direction of an associated media. The write poles may be incorporated in heads that also contain read elements such as magnetoresistive sensors, and may be employed with information storage systems such as disk drives.

BRIEF DESCRIPTION OF THE FIGURES

FIG. 1 is a schematic top view of an information storage system including a spinning disk and an arm that sweeps a transducer over the disk surface to move between concentric tracks.

FIG. 2 is a prior art system for perpendicular recording, including a transducer with a write pole and a return pole and a media with a soft magnetic underlayer.

FIG. 3 is a prior art pattern of magnetization of the write pole of FIG. 2 for a track where the transducer is skewed relative to the track.

DETAILED DESCRIPTION OF THE PREFERRED EMBODIMENTS

Figure 4:
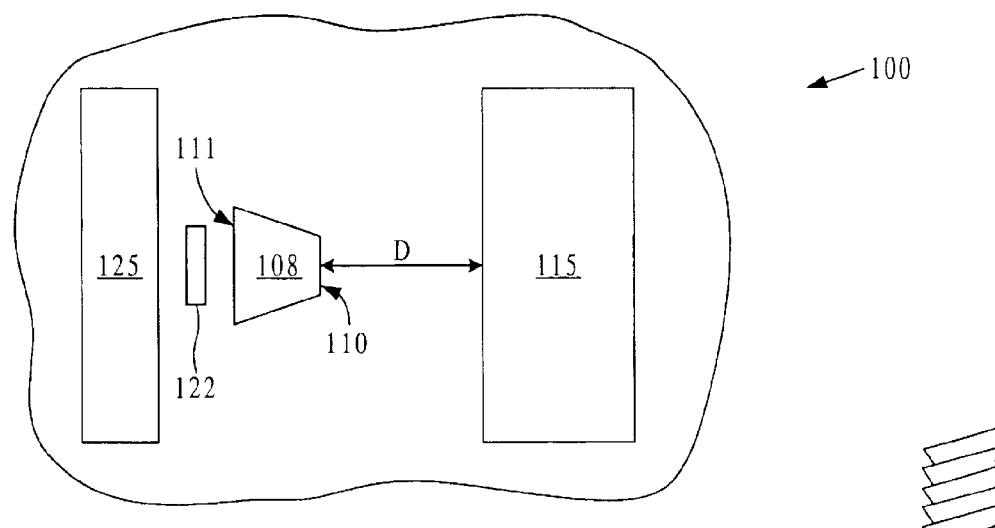
FIG. 4 is a media-facing view of a transducer in accordance with the present invention.
Figure 5:
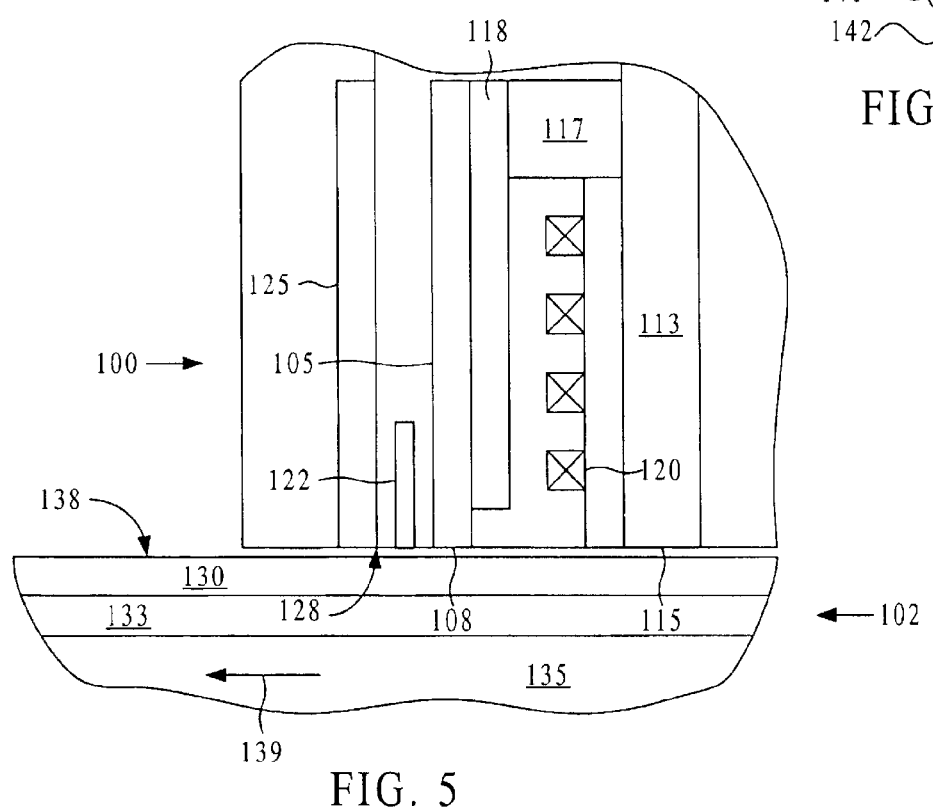
FIG. 5 is a cutaway schematic side view of the transducer of FIG. 4 in proximity to a relatively moving media.

FIG. 4 depicts a media-facing view of a transducer 100 in accordance with the present invention, and FIG. 5 depicts a cutaway side view of that transducer 100 interacting with a relatively moving media 102. The transducer 100 includes a write pole layer 105 with a write pole tip 108 that is magnetically exposed to the media 102. The write pole tip 108 has a leading edge 110 that is smaller than a trailing edge 111. The transducer 100 also contains a return pole layer 113 with a return pole tip 115 that is magnetically exposed to the media 102.

The write pole layer 105 and the return pole layer 113 are made of soft magnetic materials, such as nickel-iron Permalloy ($Ni_{80}Fe_{20}$). Optionally, the write pole layer 105 or a trailing layer of the write pole layer may be made of a high magnetic saturation (high $B_{SAT}$) material such as a predominantly-iron nickel-iron alloy (e.g., $Ni_{45}Fe_{55}$). The write pole layer 105 and the return pole layer 113 are magnetically coupled in the transducer 100 by first and second soft magnetic coupling layers 117 and 118. An electrically conductive coil layer 120 is provided for inducing a magnetic flux in the pole layers 105 and 113 and coupling layers 117 and 118.

An optional magnetoresistive (MR) sensor 122 is disposed in the transducer 100 adjacent the write pole 108. MR sensor 122 may be an anisotropic magnetoresistive (AMR) sensor, spin:valve (SV) sensor, spin tunneling (ST) sensor, giant magnetoresistive (GMR) sensor or other type of MR sensor. Although a MR sensor is shown, other sensors, such as magneto-optical sensors may instead be employed for reading magnetic fields from the media 102. Alternatively, the write pole 105 may be used to sense magnetic fields from the media 102, with the changing fields of the relatively moving media inducing a current in the coil 120 that is read as a signal. A soft magnetic shield layer 125 is disposed adjacent to the sensor 122, the shield layer 125 and the write pole layer 105 shielding the MR sensor 122 from magnetic flux that is not located in a portion of the media adjacent to the sensor. A nonmagnetic protective coating, not shown, may be disposed on a media-facing surface 128 of the transducer, protecting the sensor 122 from damage and corrosion. Areas of the transducer 100 that are shown in FIG. 4 and FIG. 5 and that have not, for conciseness, been specifically labeled with element numbers, are made of nonferromagnetic and electrically nonconductive materials such as alumina ($Al_2O_3$).

The media 102, which may for example be a rigid disk, includes a media layer 130 and underlayer 133 disposed atop a self-supporting substrate 135. A protective coating, not shown, may be disposed on a surface 138 of the media 102, protecting the media layer 130 from damage and corrosion. The substrate 135 may be formed of glass, aluminum or other known materials. The underlayer 133 may be made of Permalloy or other soft magnetic materials. The media layer 130 may be formed of a stack of layers alternating between ferromagnetic (e.g., Co and Fe) and platinum group metal metals (e.g., Pt and Pd) for example, and may have an easy axis of magnetization substantially perpendicular to the media surface 138. The media 102 is moving relative to the transducer in a direction indicated by arrow 139.

To provide a more concentrated magnetic flux in a portion of the media 102 adjacent the write pole tip 108 than in a portion of the media adjacent the return pole tip 115, the area of the return pole tip 115 may be substantially larger than that of the write pole tip 108. Also, to provide a magnetic signal to the media 102 that does not bridge a gap between the write pole tip 108 and the return pole tip 115, a distance between those pole tips may be substantially larger than that between the write pole tip 108 and the soft magnetic underlayer 133, as factored by the coercivity of the media layer 130. For current operating conditions, a sufficient magnetic signal is communicated between the media 102 and the write pole tip 108 provided that a distance D between the write pole tip 108 and the return pole tip 115 is greater than one micron.

Figure 6:
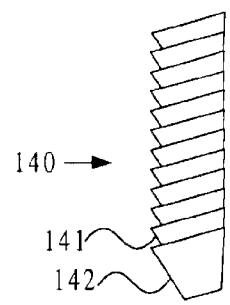
FIG. 6 is a pattern of magnetization of the media of FIG. 5 by the transducer of FIG. 4 and FIG. 5 for a track where the transducer is skewed relative to the track.

FIG. 6 shows a pattern of magnetization 140 written in the media layer 130 by the write pole tip 108 on a track for which the transducer 100 is skewed relative to the track. The write pole tip 108 has a novel trapezoidal-shaped area facing the media 102, which can be seen in the most recent magnetization 142. Prior magnetizations written to the media, such as magnetization 141, do not have edge effects or side writing the skew. As a result, errors in reading data can be substantially reduced. Note that prior magnetizations written to the media, such as magnetization 141, also have a trapezoidal-shaped area.

Figure 7:
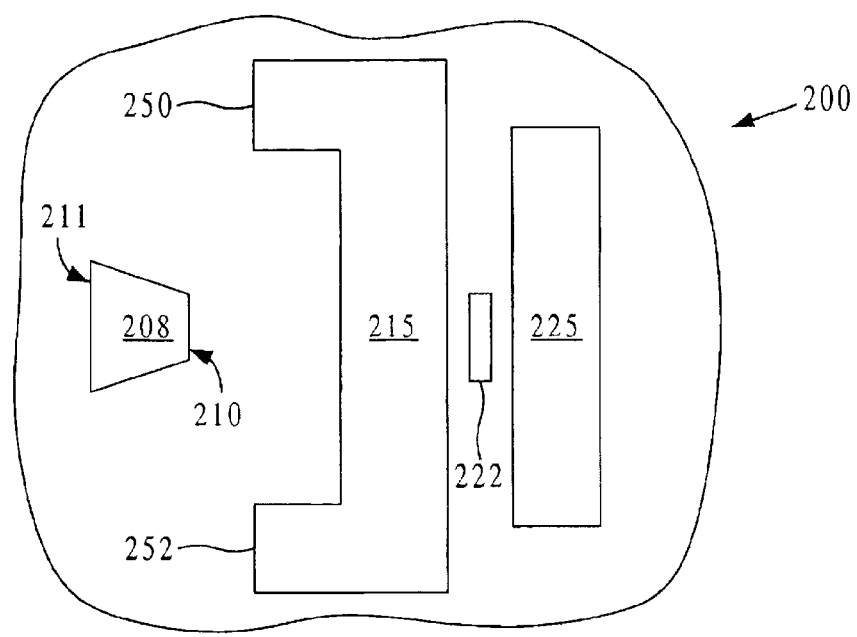
FIG. 7 is a media-facing view of another embodiment of a transducer in accordance with the present invention.
Figure 8:
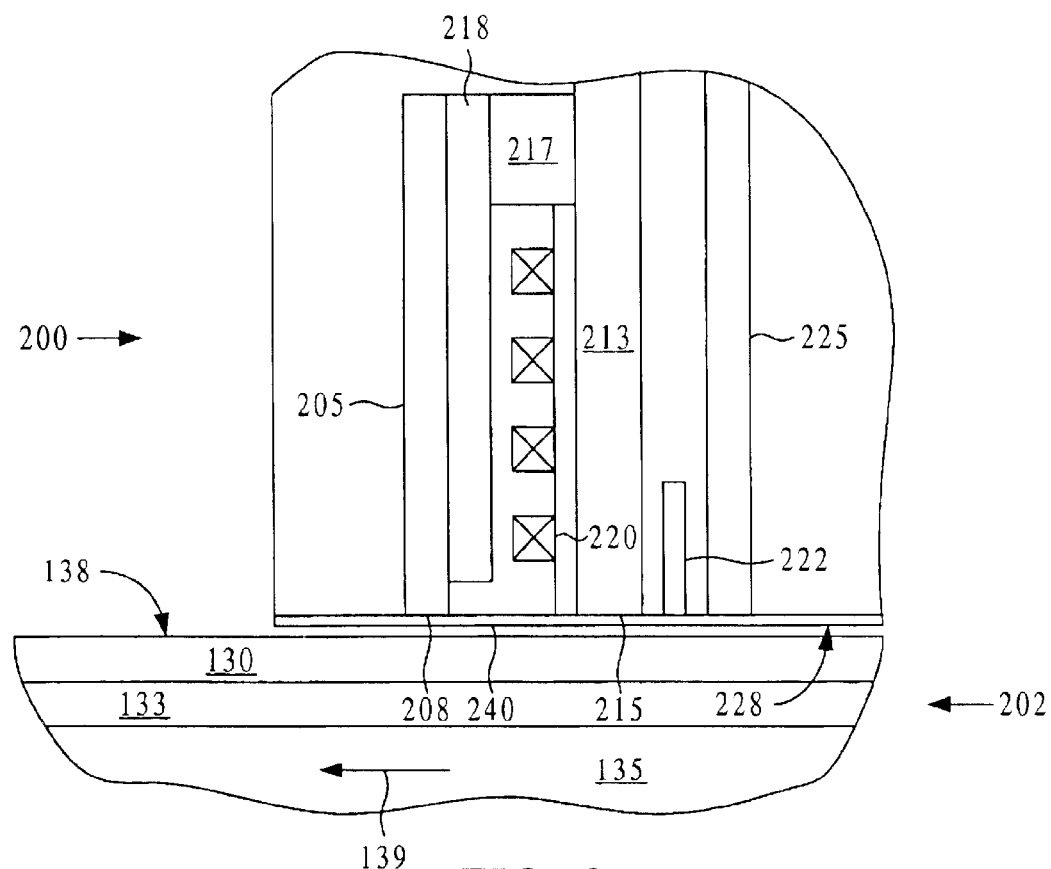
FIG. 8 is a cutaway schematic side view of the transducer of FIG. 7 in proximity to the relatively moving media shown in FIG. 6.

FIG. 7 depicts a media-facing view of another transducer 200 in accordance with the present invention, and FIG. 8 depicts a cutaway side view of that transducer 200 interacting with the media 102. The transducer 200 includes a write pole layer 205 with a write pole tip 208 that is magnetically exposed to the media 102. The write pole tip 208 has a leading edge 210 that is smaller than a trailing edge 211. The transducer 200 also contains a return pole layer 213 with a return pole tip 215 that is magnetically exposed to the media 102. The write pole layer 205 and the return pole layer 213 are magnetically coupled in the transducer 200 by first and second soft magnetic coupling layers 217 and 218. An electrically conductive coil layer 220 is provided for inducing a magnetic flux in the pole layers 205 and 213 and coupling layers 217 and 218. The return pole tip 215 includes a pair of peninsulas 250 and 252 that extend in a trailing direction near the media facing surface 228, and which may be formed at the same time as the coupling layer 217.

An optional magnetoresistive (MR) or other sensor 222 is disposed in the transducer 200 adjacent the return pole layer 213. Alternatively, the write pole 205 may be used to sense magnetic fields from the media 102, with the changing fields of the relatively moving media inducing a current in the coil 220 that is read as a signal. A soft magnetic shield layer 225 is disposed adjacent to the sensor 222, the shield layer 225 and the return pole layer 213 shielding the MR sensor 222 from magnetic flux that is not located in a portion of the media adjacent to the sensor. A nonmagnetic protective coating 240 is disposed on a media-facing surface 228 of the transducer, protecting the sensor 222 from damage and corrosion. Areas of the transducer 100 shown in FIG. 7 and FIG. 8 that have not, for conciseness, been labeled with element numbers, are made of nonmagnetic and electrically nonconductive materials, such as alumina. The transducer 200 may contact the media 102 during data communication, or may be spaced a minimal distance (e.g., less than 100 nanometers) from the media during reading or writing.

Figure 9:
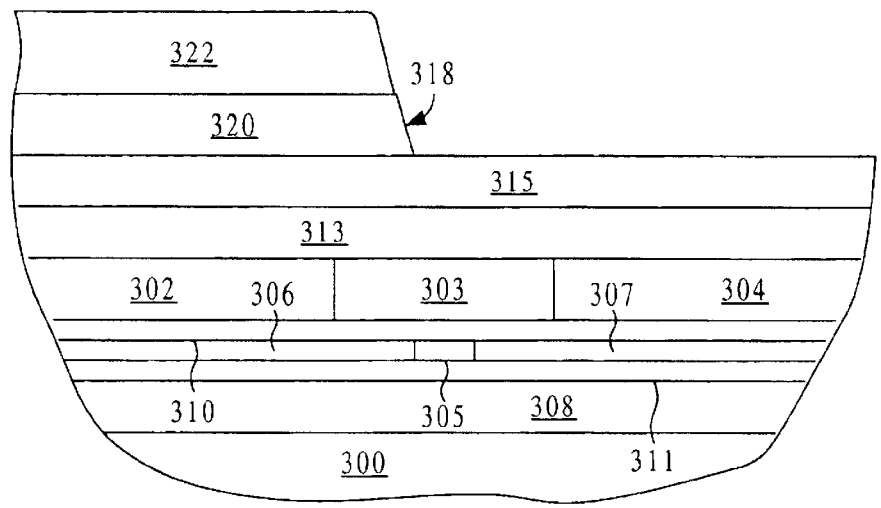
FIG. 9 is a cross-sectional view of some initial steps in a first method of forming a write pole tip having a trailing edge that is wider than a leading edge.

FIG. 9 shows some steps in a first method of forming a write pole tip having a trailing edge that is wider than a leading edge, such as write pole tip 108 or 208. Although it is possible to form such a structure by focused ion beam (FIB) etching of the media-facing surface, FIB etching creates a trench around each pole tip and may leave some redeposited magnetic material near the pole tip. FIB etching is also limited in extent, so that the desired pole tip shape may extend for example less than a micron from the media-facing surface, which can result in fringe fields for perpendicular recording that defocus the magnetic pattern on the media. Moreover, FIB etching is performed individually on each pole tip, as opposed to essentially simultaneous production of many hundreds or thousands of pole tips on a wafer.

In FIG. 9, which shows a cross-section of a portion of a wafer substrate 300 and appended transducer layers near what will become a media-facing surface, a return pole layer 303 of Permalloy has been formed by electroplating atop conventional MR sensor layers 305 and a conventional Permalloy shield layer 308. Electrically conductive lead layers 306 and 307 have been formed generally coplanar with sensor layers 305, to provide electric current to the sensor layers. Return pole layer 303, sensor and lead layers 305–307, and shield layer 308 are separated by read gap layers 310 and 311, which may be made of alumina or other nonferromagnetic and electrically nonconductive materials. Similar dielectric materials have been formed in layers 302 and 303 on either side of the return pole layer 303. Additional dielectric spacer layers 313 and 315 have been formed coplanar to respective soft magnetic coupling layers, not shown in this figure. The dielectric layers having been formed by sputter or other deposition that overlaps the electroplated magnetic coupling layers, followed by chemical mechanical polishing (CMP) or otherwise smoothing each combined coupling and alumina layer to a planar surface.

To create a write pole tip having tapered sides, a nonferromagnetic and electrically nonconductive layer 320 is first formed, for example of alumina, on top of the surface of the dielectric layer 315 and the soft magnetic coupling layer that is not shown in this figure. Layer 320 is covered with a photoresist or other mask 322, which is formed with an edge adjacent to where an edge of a write pole layer is desired. A directional dry etch, such as an ion beam etch (IBE) is then applied to create a sloping side 318 of dielectric layer 320 and to expose the soft magnetic coupling layer that is coplanar with dielectric layer 315. The mask 322 is then removed, and a conductive seed layer is deposited onto the exposed magnetic coupling layer and dielectric layers 315 and 320.

Figure 10:
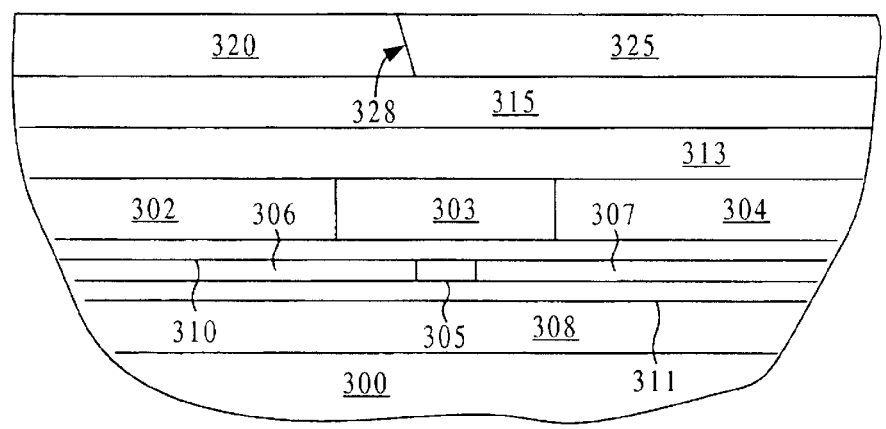
FIG. 10 is a cross-sectional view of some steps subsequent to the steps shown in FIG. 9 in the first method of forming a write pole tip having a trailing edge that is wider than a leading edge.

In FIG. 10, a soft magnetic write pole layer 325 has been electroplated atop the conductive seed layer, after which the seed layer and write pole layer 325 have been CMP or otherwise polished to remove the portion of pole layer 325 that was formed atop dielectric layer 320. A side 328 of pole layer 325 that abuts dielectric layer 320 has a slope that is not perpendicular to the wafer 300 surface. This tapered side 328 will become a side of the write pole tip, with the slope causing a trailing edge of the pole tip to be larger than a leading edge of the pole tip.

Figure 11:
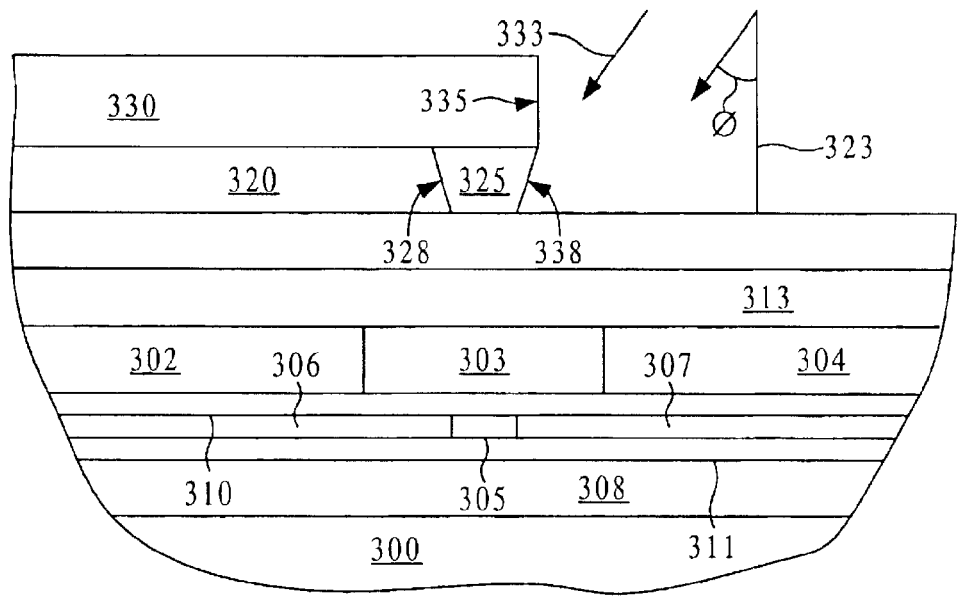
FIG. 11 is a cross-sectional view of some steps subsequent to the steps shown in FIG. 10 in the first method of forming a write pole tip having a trailing edge that is wider than a leading edge.

In FIG. 11, a mask 330 has been created atop dielectric layer 320 and overlapping the write pole layer 325, with a mask edge 335 defined near the side 328 of the write pole layer 325. A dry etch such as an IBE is then applied in the direction of arrows 333 to create a sloping side 338 of write pole layer 325, resulting in a trapezoidal shape of the pole layer 325 cross-section, which will become the trapezoidal pole tip. The directional etch may be at an angle of incidence $\emptyset$ to the wafer 300 surface that is on an opposite side of a normal 323 to that surface than the IBE or other directional removal that created side 328.

The angle of incidence $\emptyset$ may also vary in order to achieve a desired undercut and slope of side 328. For example, $\emptyset$ may begin at an angle to perpendicular of less than 45° that initially causes material removed from pole layer 325 to be redeposited on edge 335, slowing the rate of etching on that edge 335. With a bottom portion of layer 325 being removed at a greater rate than a top portion of that layer, the desired undercut of side 338 is created. A larger angle $\emptyset$ IBE may then be performed that removes redeposited material. The wafer can be set at a fixed tilt to create side 338 or the IBE can sweep between acute and obtuse directions to perpendicular.

Figure 12:
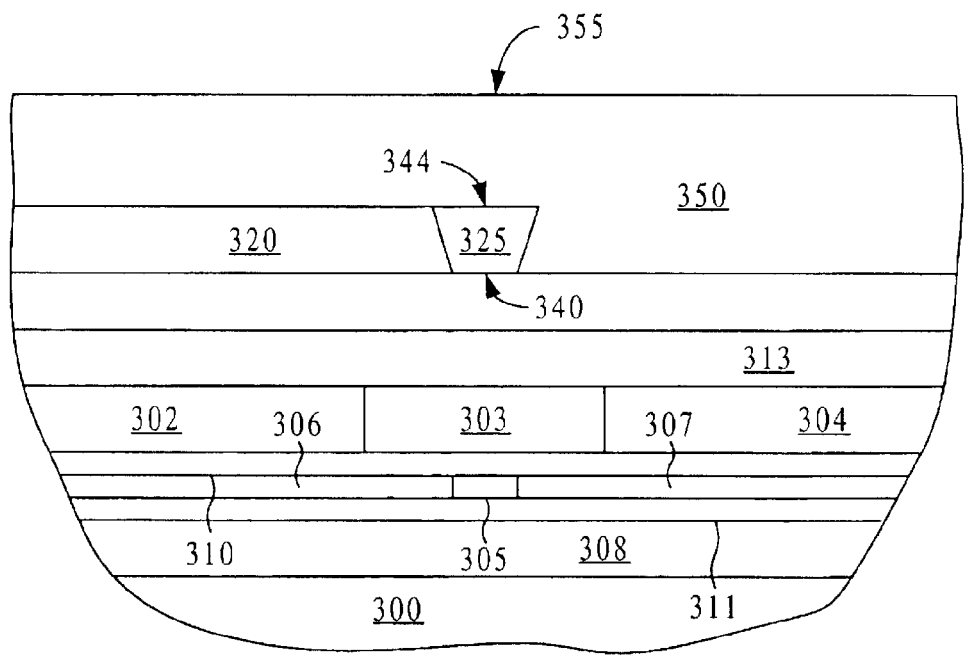
FIG. 12 is a cross-sectional view of some steps subsequent to the steps shown in FIG. 11 in the first method of forming a write pole tip having a trailing edge that is wider than a leading edge.

FIG. 12 shows the write pole layer 325 that has been formed with a leading edge 340 that is smaller than a trailing edge 344. After formation of the write pole layer 325 as described above, a layer 350 of nonferromagnetic and electrically nonconductive material is formed, for example, of alumina, creating a trailing edge 355 of the head. The layer 350 may be formed by sputtering or other directional deposition at an angle that sweeps over the wafer surface to avoid air pockets, or the layer 350 may be formed by an isotropic deposition, such as chemical vapor deposition (CVD). The wafer substrate 300 is then diced or otherwise divided into rows of individual heads each containing transducer layers similar to those shown in FIG. 12, including exposing the wafer and transducer layers along the cross-section shown in FIG. 12. A media-facing surface is then created from that exposed area, including polishing the surface, tailoring any media-facing relief and optionally coating the surface with a protective dielectric material, after which the individual heads are released from the row and integrated into storage systems.

Figure 13:
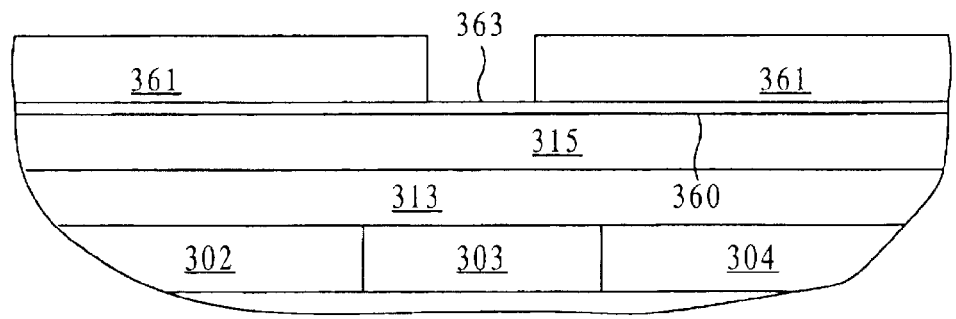
FIG. 13 is a cross-sectional view of some initial steps in a second method of forming a write pole tip having a trailing edge that is wider than a leading edge.

FIG. 13 shows another method for making a transducer in accordance with the present invention. For conciseness, the elements described above with regard to previous figures are not described for FIG. 13. In this example, creation of a write pole tip having tapered sides begins with formation of an electrically conductive seed layer 360 on the surface of the dielectric layer 315 and the soft magnetic coupling layer that is not shown in this figure. Atop the seed layer 361 a photoresist layer 360 has been patterned by photolithography to form an aperture 363 exposing the surface of the seed layer 360 atop the soft magnetic coupling layer.

Figure 14:
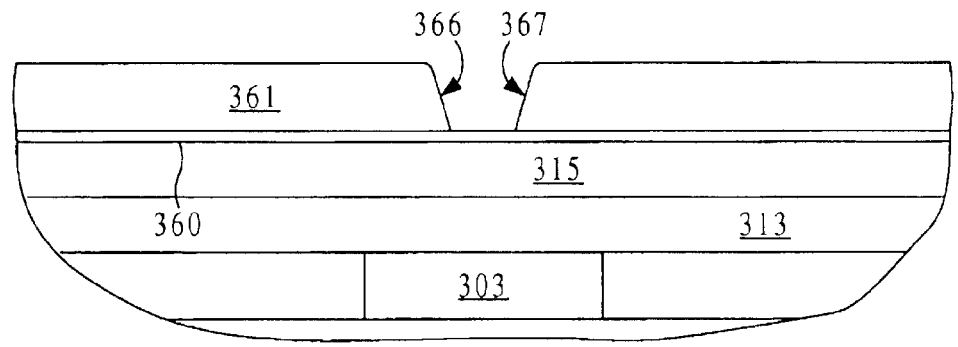
FIG. 14 is a cross-sectional view of some steps subsequent to the steps shown in FIG. 13 in the second method of forming a write pole tip having a trailing edge that is wider than a leading edge.

The photoresist layer 361 is then baked, as shown in FIG. 14, to form sloping sides 366 and 367 that provide a tapered mold for forming the trailing pole tip. The baking may be at a temperature ranging between 70° C. and 120° C., and typically between 80° C. and 100° C., with the slope of the sides controlled by the temperature. A 95° C. bake for 15 minutes has proven effective. A soft magnetic write pole layer 370 is formed by electroplating atop the exposed portion of the seed layer 360.

Figure 15:
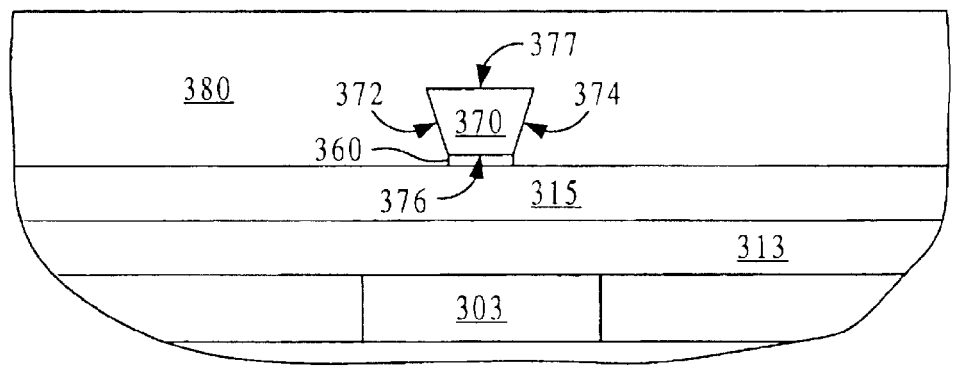
FIG. 15 is a cross-sectional view of some steps subsequent to the steps shown in FIG. 14 in the second method of forming a write pole tip having a trailing edge that is wider than a leading edge.

FIG. 15 shows the write pole layer 370 after the photoresist layer 361 has been chemically removed, and ion milling has removed the portion of the seed layer 360 that was covered by photoresist layer 361. The write pole layer 370 has sloping sides 372 and 374 and a leading edge 376 that is smaller than a trailing edge 377. A dielectric layer 380 has been formed that encases the write pole layer 370. The layer 380 may be formed by sputtering or other directional deposition at an angle that sweeps over the wafer surface to avoid air pockets, or the layer 380 may be formed by an isotropic deposition, such as CVD. A MR or other sensor may now be formed on layer 380 for the case in which such a sensor was not formed previously.

Figure 16:
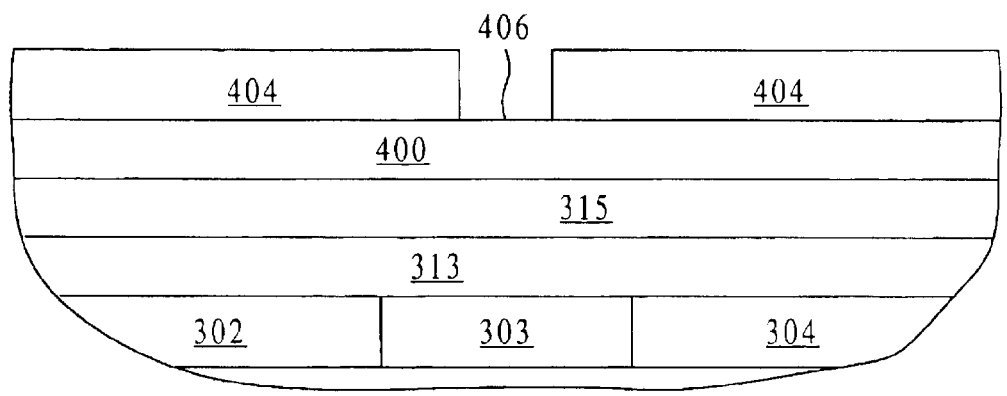
FIG. 16 is a cross-sectional view of some initial steps in a third method of forming a write pole tip having a trailing edge that is wider than a leading edge.

FIG. 16 shows another method for making a transducer in accordance with the present invention. In this example, creation of a write pole tip having tapered sides begins with formation of a dielectric layer 400 on the surface of dielectric layer 315 and the soft magnetic coupling layer that is not shown in this figure. A photoresist layer 404 is then deposited and patterned to forman aperture 406 exposing the surface of the dielectric layer 400.

Figure 17:
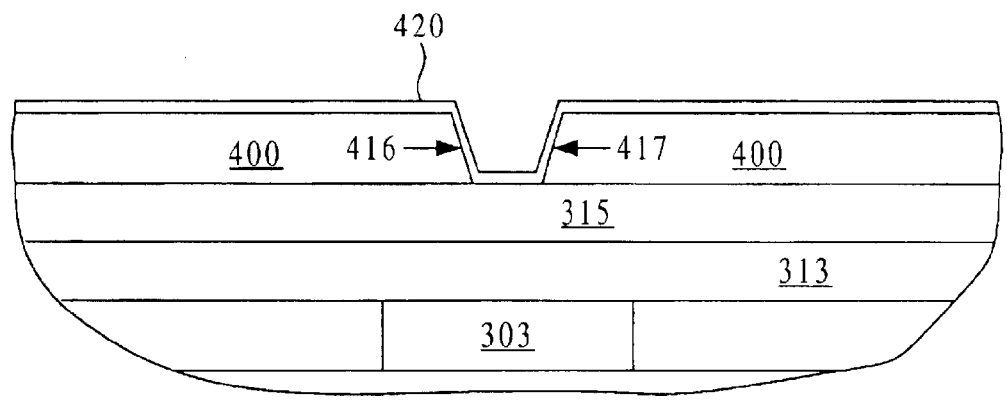
FIG. 17 is a cross-sectional view of some steps subsequent to the steps shown in FIG. 16 in the third method of forming a write pole tip having a trailing edge that is wider than a leading edge.

A directional dry etch, such as IBE is then applied to create sloping sides 416 and 417 of dielectric layer 400 and to expose the soft magnetic coupling layer that is coplanar with dielectric layer 315. The mask 322 is then removed, and an electrically conductive seed layer 420 is deposited onto the exposed magnetic coupling layer and dielectric layers 315 and 400, as shown in FIG. 17.

Figure 18:
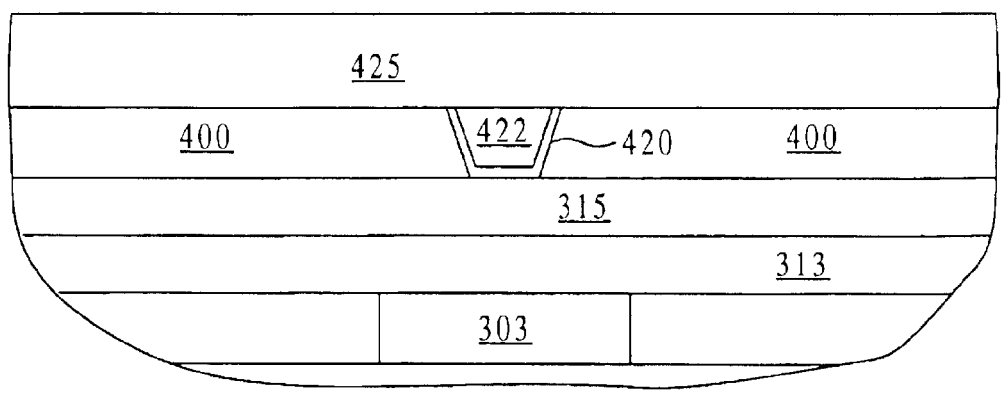
FIG. 18 is a cross-sectional view of some steps subsequent to the steps shown in FIG. 17 in the third method of forming a write pole tip having a trailing edge that is wider than a leading edge.

FIG. 18 shows that a soft magnetic write pole layer 422 has been electroplated onto the electrically conductive seed layer 420, after which the wafer has been polished, and another dielectric layer 425 deposited.

Figure 19:
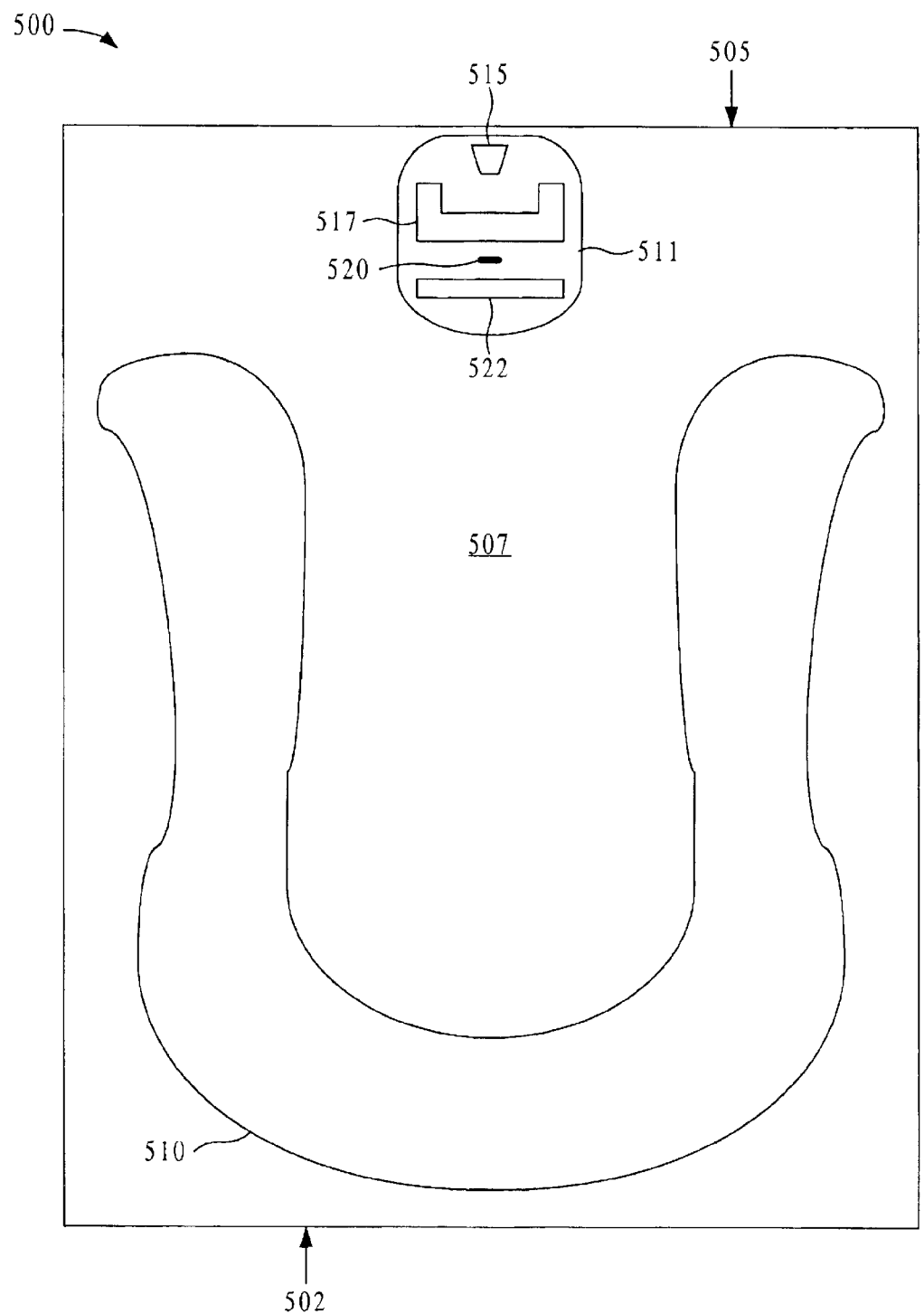
FIG. 19 is a top view of a media-facing surface of a slider having a transducer in accordance with the present invention.

FIG. 19 is a media-facing view of a head or slider 500 in accordance with the present invention. The head 500 has a leading end 502, a trailing end 505, and a media-facing surface 507. The media-facing surface 507 has a U-shaped projection 510 and a trailing pad 511 containing transducer elements described above. At least part of the trailing pad 511 has been coated with a transparent protective coating such as diamond-like carbon (DLC), and the pad 511 may contact or be disposed in close proximity to a rapidly-moving media, not shown in this figure. Other known configurations for the media-facing surface may alternatively be employed. The transducer elements include a write pole tip 515 having a trapezoidal shape, a return pole tip 517, a MR sensor 520 and a magnetic shield 522. The slider 500 can be mechanically and electrically connected by conventional means to the arm 28 shown in FIG. 1.

Although we have focused on teaching the preferred embodiments of an improved electromagnetic transducer, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. A magnetic head for recording information on a relatively-moving medium, the head having a leading end, a trailing end, and a medium-facing surface, the head comprising:

a first soft magnetic layer extending a first distance substantially perpendicular to the medium-facing surface and terminating at a first pole tip disposed adjacent to said medium-facing surface, said first pole tip having a leading edge and a trailing edge, wherein said trailing edge is substantially larger than said leading edge;

a second soft magnetic layer extending substantially perpendicular to the medium-facing surface and terminating at a second pole tip disposed adjacent to said medium-facing surface, said second pole tip having a medium-facing area that is substantially larger than that of said first pole tip; and a third soft magnetic layer extending a second distance substantially perpendicular to the medium-facing surface, adjoining said first soft magnetic layer and terminating further than said first pole tip from said medium-facing surface, wherein said second distance is more than half said first distance.

2. The head of claim 1, wherein said first pole tip has a trapezoidal shape.

3. The head of claim 1, wherein said first soft magnetic layer has a cross-sectional shape at a location at least one micron from said first pole tip that is substantially equal to a face of said first pole tip.

4. The head of claim 1, wherein said first pole tip is separated from said second pole tip by at least one micron.

5. The head of claim 1, further comprising a magnetoresistive sensor disposed adjacent to one of said pole tips.

6. The head of claim 1, further comprising an electrically conductive coil section disposed between said second and third soft magnetic layers, wherein said third soft magnetic layer is disposed closer than said coil section to said medium-facing surface.

7. The head of claim 1, wherein the medium has an easy axis of magnetization substantially perpendicular to said medium-facing surface.

8. The head of claim 1, wherein the medium has a soft magnetic underlayer.

9. A magnetic head for recording information on a spinning disk, the head having a leading end, a trailing end, and a disk-facing surface, the head comprising:

a first soft magnetic layer disposed in said head and terminating at a first pole tip disposed adjacent to said disk-facing surface, a second soft magnetic layer disposed in said head and terminating at a second pole tip disposed adjacent to said disk-facing surface, said second pole tip having a leading edge and a trailing edge, wherein said leading edge is disposed further than said trailing edge from said leading end and said trailing edge is substantially larger than said leading edge;

an electrically conductive coil section disposed between said first and second soft magnetic layers; and a third soft magnetic layer adjoining said second soft magnetic layer, said third soft magnetic layer terminating further than said second pole tip from said disk-facing surface, said third soft magnetic layer terminating closer than said coil section to said disk-facing surface.

10. The head of claim 9, wherein said second pole tip has a trapezoidal shape.

11. The head of claim 9, wherein said second soft magnetic layer has a cross-sectional shape at a location at least one micron from said second pole tip that is substantially equal to a shape of second pole tip.

12. The head of claim 9, further comprising a magnetoresistive sensor disposed adjacent to one of said pole tips.

13. The head of claim 9, wherein said first pole tip includes a pair of peninsulas.

14. The head of claim 9, wherein said first pole tip is separated from said second pole tip by at least one micron.

15. The head of claim 9, wherein the disk has a media layer with an easy axis of magnetization substantially perpendicular to said disk-facing surface.

16. The head of claim 9, wherein the disk has a soft magnetic underlayer.

17. An information storage system comprising:

a rigid disk spinning about a disk center, said disk having a media layer adjacent to a disk surface, the media layer having an easy axis of magnetization that is substantially perpendicular to the disk surface;

an arm having a free end adjacent to said disk surface, said arm adapted to move said end toward and away from said disk center;

a head coupled to said free end, said head having a leading end, a trailing end, and a disk-facing surface, said disk-facing surface disposed adjacent to said disk surface;

a first soft magnetic layer disposed in said head and terminating in a first pole tip disposed adjacent to said disk-facing surface;

a second soft magnetic layer disposed in said head and terminating in a second pole tip disposed adjacent to said disk-facing surface, said second pole tip having a leading edge and a trailing edge, wherein said trailing edge is disposed closer than said leading edge to the trailing end and said trailing edge is substantially larger than said leading edge;

an electrically conductive coil section disposed between said first and second soft magnetic layers; and a third soft magnetic layer adjoining said second soft magnetic layer, said third soft magnetic layer terminating further than said second pole tip from said disk-facing surface, said third soft magnetic layer terminating closer than said coil section to said disk-facing surface.

18. The system of claim 17, wherein said second pole tip is disposed adjacent to a substantially circular disk track that is concentric with said disk center, and said trailing edge is not perpendicular to said disk track at a point of said track that is nearest to said trailing edge.

19. The system of claim 17, wherein said disk has first and second substantially circular and concentric tracks, and said pole tips are aligned with said first track and not aligned with said second track.

20. The system of claim 17, wherein said second pole tip has a trapezoidal shape.

21. The system of claim 17, further comprising a magnetoresistive sensor disposed adjacent to one of said pole tips.

22. The system of claim 17, wherein said pole tips are separated from each other by at least one micron.

23. The system of claim 17, wherein said disk has a soft magnetic underlayer disposed adjacent to said media layer.

24. The device of claim 17, wherein said media layer has pattern of magnetization with a trapezoidal shape.

25. The system of claim 17, wherein said second soft magnetic layer has a cross-sectional shape at a location at least one micron from said second pole tip that is substantially equal to a shape of second pole tip.

* * * * *